United States Patent [19]

Spencer

[11] Patent Number: 4,519,417
[45] Date of Patent: May 28, 1985

[54] DEVICES FOR CONTROLLING FLOW OF FLUID UNDER PRESSURE

[75] Inventor: Byron A. T. Spencer, Hillsdale, N.J.
[73] Assignee: Lucas Industries Inc., Troy, Mich.
[21] Appl. No.: 280,630
[22] Filed: Jul. 6, 1981
[51] Int. Cl.³ .......................................... F16K 31/124
[52] U.S. Cl. .................................. 137/501; 137/110; 137/115
[58] Field of Search ........................................ 137/501

[56] References Cited

U.S. PATENT DOCUMENTS 3,168,902 2/1965 Pearl ................................. 137/501

FOREIGN PATENT DOCUMENTS 431494 9/1975 U.S.S.R. .............................. 137/501

Primary Examiner—Martin P. Schwadron
Assistant Examiner—James R. Shay
Attorney, Agent, or Firm—Ladas & Parry

[57] ABSTRACT

A system for controlling flow of fluid along a conduit from a source of fluid under pressure to a consumer device comprises a primary throttle for connection in the conduit and controllable between a first condition in which it is at least partially closed and a second condition in which it is more fully open, and a secondary throttle defining at least one orifice for connection in the conduit and including a member which is displaceable to vary the area of the orifice. A first force dependent upon the pressure drop across the secondary throttle and a second force dependent upon the time integral of the pressure drop across the primary throttle are applied to the member, the first and second forces being oppositely directed, whereby the member is displaced towards a position in which the pressure drop across the secondary throttle bears a predetermined relationship to the time integral of the pressure drop across the secondary throttle.

8 Claims, 9 Drawing Figures

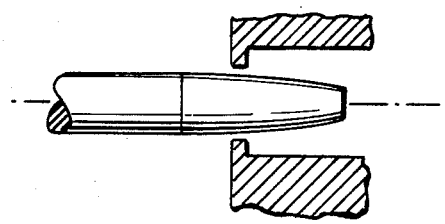
Fig.2A
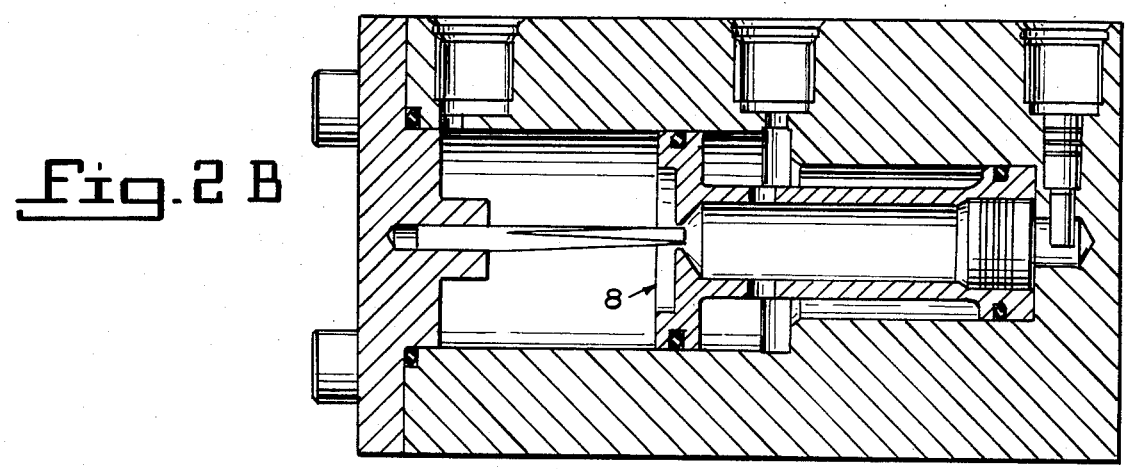
Fig.2B
Fig.3
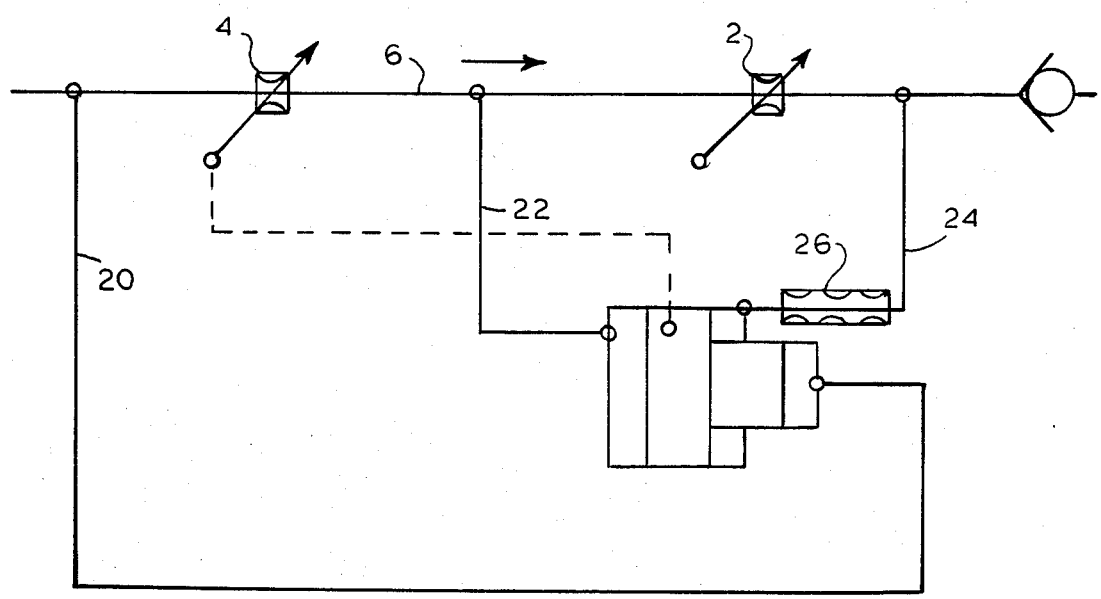

DEVICES FOR CONTROLLING FLOW OF FLUID UNDER PRESSURE

This invention relates to devices for controlling flow of fluid under pressure, and is particularly concerned with a device for controlling flow of liquid fuel to a jet engine.

As might be expected, the graph of steady state jet engine speed against fuel flow is a generally upward curve. When the engine is operating at a steady fuel flow below that which is associated with maximum engine speed, and the fuel flow is then increased, the engine speed does not immediately increase to the value associated with the higher fuel flow, but there is rather some delay before the engine speed reaches the higher value. If the fuel flow is suddenly increased by an excessive amount, the engine is overfueled and malfunctions. It is essential that overfueling of the engine be avoided.

Overfueling can be avoided by interposing a servo control between the operator of the jet engine (usually an aircraft pilot) and the fuel flow control valve, so that the fuel flow never increases by such an amount and so rapidly as to cause overfueling. However, in such a system the operator has no direct mechanical link to the valve, and in addition the control is effective not only upon increase in fuel demand but also upon decrease in fuel demand.

According to a first aspect of the present invention there is provided a system for controlling flow of fluid along a conduit from a source of fluid under pressure to a consumer device, comprising a primary throttle means and a secondary throttle means for connection in the conduit, said primary throttle means being controllable between a first condition in which the primary throttle means is at least partially closed and a second condition in which the primary throttle means is more fully open, means for detecting the pressure drop across the primary throttle means, means for detecting the pressure drop across the secondary throttle means, and servo means for controlling the secondary throttle means to establish a predetermined relationship between the pressure drop across the secondary throttle means and the time integral of the pressure drop across the primary throttle means.

According to a second aspect of the present invention there is provided a system for delivering fluid at a controlled rate from a source of fluid under pressure to a consumer device, comprising first and second conduit which are connected in parallel, a primary throttle means for connection in the first conduit and controllable between a first condition in which it is at least partially closed and a second condition in which it is more fully open, a control throttle means for connection in the first conduit, a controlled throttle means for connection in the second conduit, means for detecting the pressure drop across the primary throttle means, means for detecting the pressure drop across the control throttle means, servo means for controlling the control throttle means to establish a predetermined relationship between the pressure drop across the primary throttle means and the control throttle means and the time integral of the pressure drop across the primary throttle means, and means for slaving the controlled throttle means to the control throttle means.

According to a third aspect of the present invention there is provided a system for controlling flow of fluid along a conduit from a source of fluid under pressure to a consumer device, comprising a primary throttle means for connection in the conduit and controllable between a first condition in which it is at least partially closed and a second condition in which it is more fully open, and a secondary throttle means defining at least one orifice for connection in the conduit and including a member which is displaceable to vary the area of the orifice, and the system further comprising means for applying to said member a first force dependent upon the pressure drop across the secondary throttle means and a second force, directed oppositely to said first force, dependent upon the time integral of the pressure drop across the primary throttle means, whereby the member is displaced towards a position in which said pressure drop bears a predetermined relationship to said time integral.

According to a fourth aspect of the present invention there is provided a system for delivering fluid at a controlled rate from a source of fluid under pressure to a consumer device, comprising first and second conduits which are connected in parallel, a primary throttle means for connection in the first conduit and controllable between a first condition in which it is at least partially closed and a second condition in which it is more fully open, and a control throttle means defining at least one orifice connected in the first conduit and including a member which is displaceable to vary the area of the orifice, and the system further comprising a controlled throttle means for connection in the second conduit, means for slaving the controlled throttle means to the control throttle means, means for applying to said member a first force dependent upon the pressure drop across the control throttle means and a second force, directed oppositely to said first force, dependent upon the time integral of the pressure drop across the primary throttle means, whereby the member is displaced towards a position in which said pressure drop bears a predetermined relationship to said time integral and said controlled throttle means is slaved accordingly.

By stating that the first throttle means is at least partially closed in the first condition it is meant that the first throttle means is not fully open; the first throttle means might be fully closed in the first condition, i.e. at the closed end of the open-to-closed range, although even in the fully closed condition there might be flow through the first throttle means. In the second condition, the first throttle means might be fully open.

For a better understanding of the invention, and to show how the same may be carried into effect, reference will now be made, by way of example, to the accompanying drawings in which.

Figure 1:
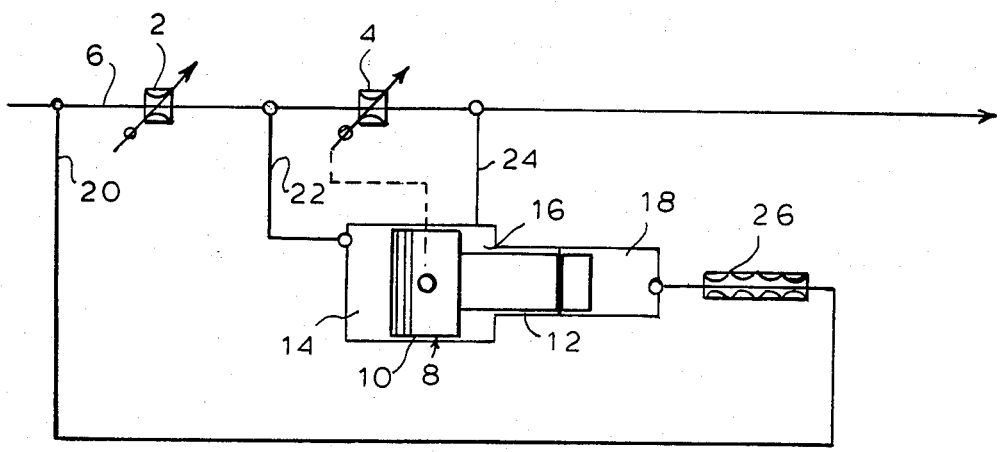
FIG. 1 shows diagrammatically a fluid flow control system.
Figure 2:
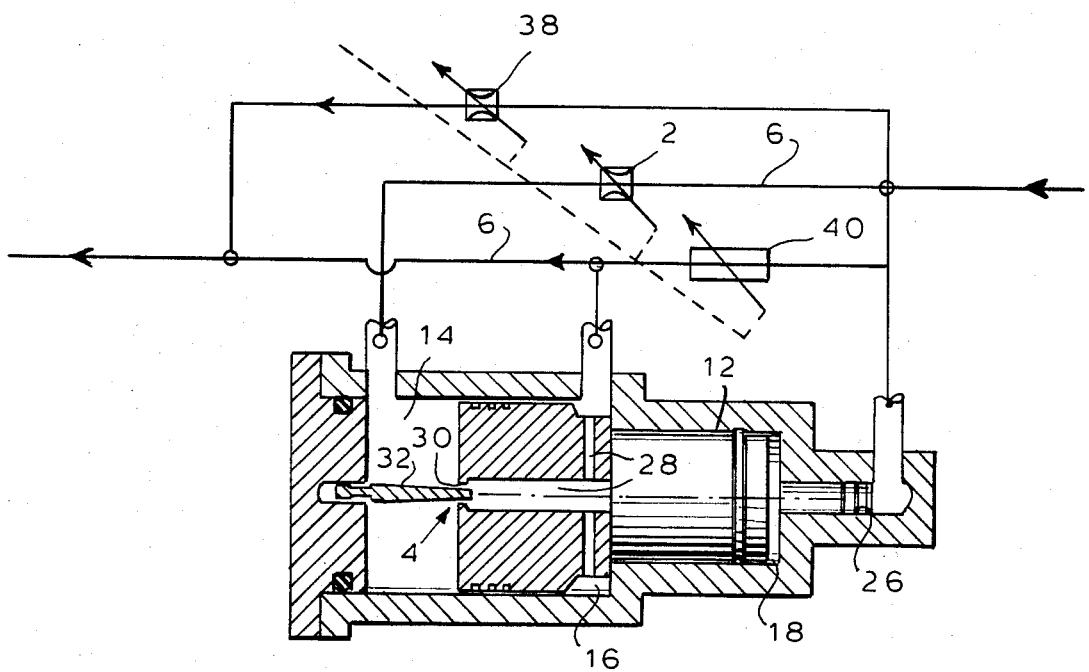
FIG. 2 shows a practical implementation of the FIG. 1 system.
Figure 4:
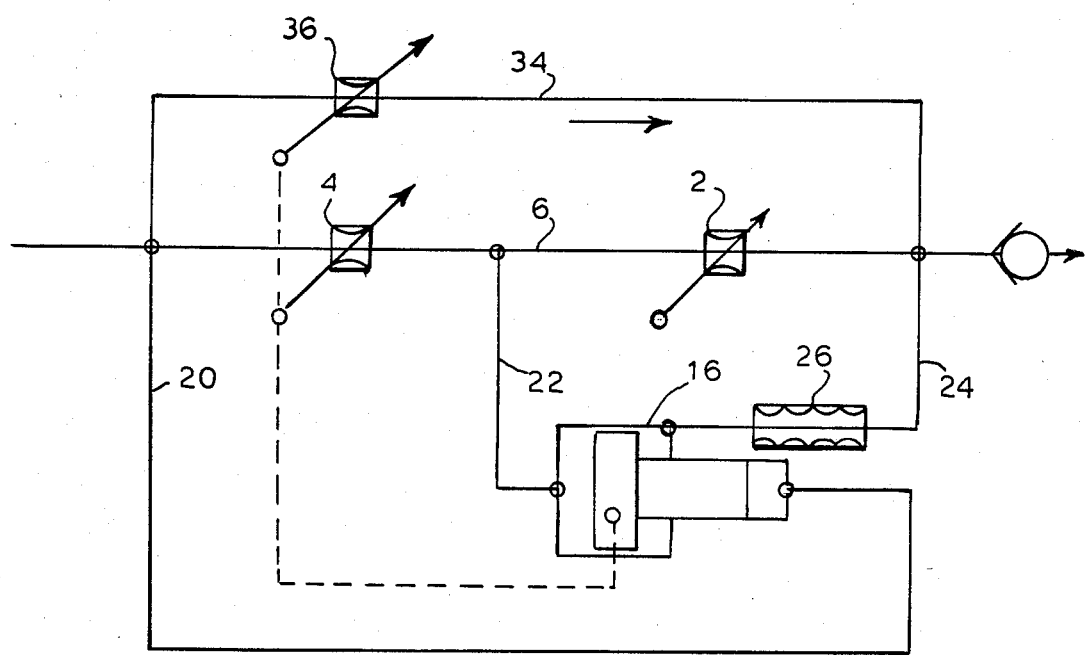
Figure 5:
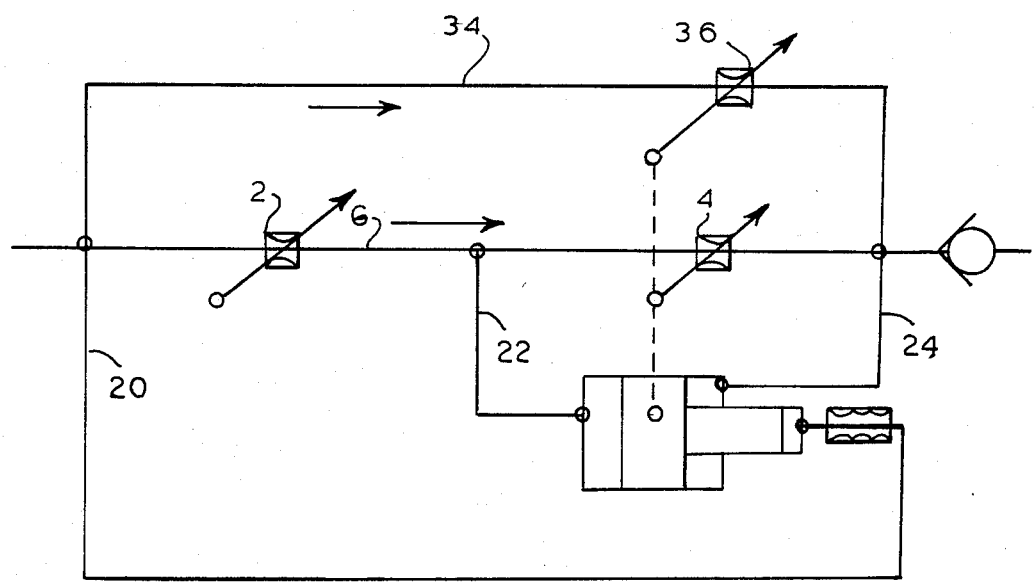
Figure 6:
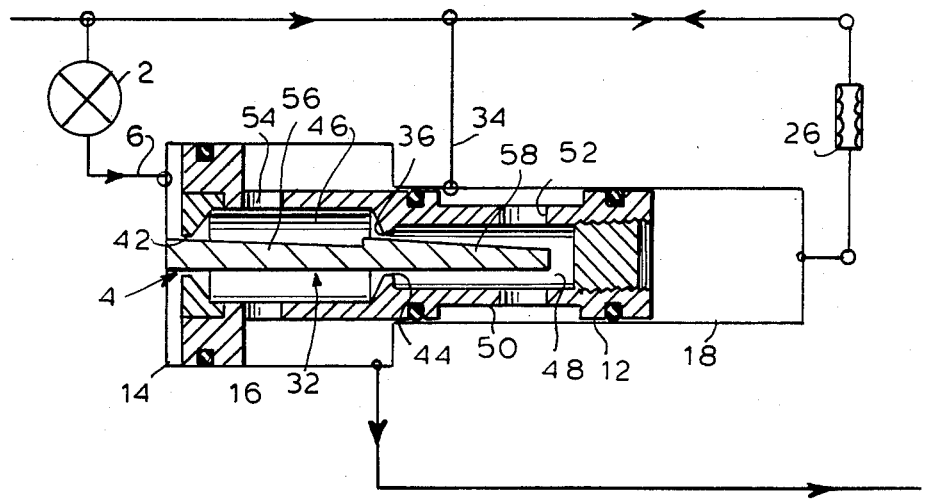

FIGS. 2 A and 2 B show a modification of FIG. 2;

FIG. 3 shows diagrammatically a modification of the FIG. 1 system;

FIG. 4 shows diagrammatically a second fluid flow control system;

FIG. 5 shows diagrammatically a modification of the FIG. 4 system;

FIG. 6 shows a practical implementation of the FIG. 5 system; and

Figure 7:
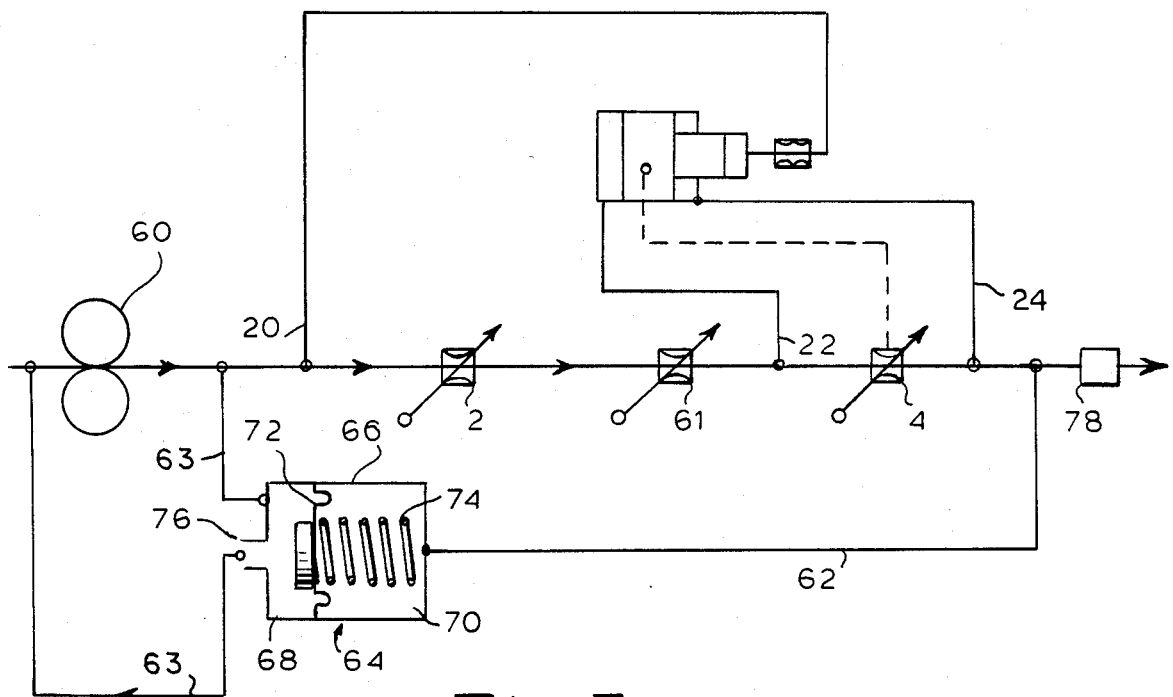

FIG. 7 shows a further modification of the FIG. 1 system.

In the different figures, like reference numerals designate like elements.

The system illustrated in FIG. 1, which is designed to control flow of fuel to an aircraft jet engine, comprises two throttles 2 and 4 which are connected in series in a conduit 6 extending between a fuel pump (not shown) and burners (not shown). The throttle 2 is under direct pilot control, whereas the throttle 4 is servo controlled.

The pump operates to drive fluid fuel under pressure along the conduit 6 through the valves 2 and 4 to the burners. The pressure of fluid in the conduit 6 is tapped of by means of three lines 20, 22 and 24 connected to the conduit 6 upstream of the two throttles, between the two throttles and downstream of the two throttles respectively.

The servocontrol for the throttle 4 comprises a piston and cylinder device coupled to the throttle 4. The piston and cylinder device comprises a piston 8 having a large portion 10 moving in a large bore of the cylinder and a small portion 12 moving in a small bore of the cylinder. The two portions 10 and 12 may be rigidly connected together. The piston portions and the bores define three chambers 14, 16 and 18.

The area of the large piston portion 10 is chosen in this example to be twice the area of the small piston portion 12. Consequently, the area of the rear face of the large portion which bounds the chamber 16 is equal to the area of the small portion. The lines 20, 22 and 24 are connected to the chambers 18, 14 and 16 respectively, the connection of the line 20 to the chamber 18 being through a rate restrictor 26. The throttle 4 is controlled in dependence upon the position of the piston. As a consequence of the two-to-one relationship between the areas of the piston faces of the portions 10 and 12, and the connections which are made to the chambers 14, 16 and 18 respectively, the piston 8 will always tend to move to a position of force balance in which the pressure drops across the throttles 2 and 4 are equal.

When the engine is operating in the steady state at a speed of, say, 60% of maximum speed, and the pilot suddenly moves the throttle 2 to its fully open position, the pressure in the line 22 is suddenly increased substantially to the pressure in the line 20. The resulting increase in pressure in the chamber 14 will urge the piston to the right of FIG. 1, opening the throttle 4 (and consequently reducing the pressure drop across the throttle 4 and between the chambers 14 and 16). However, by virtue of the presence of the restrictor 26, resisting displacement of fuel from the chamber 18, the piston is not displaced instantaneously to a new steady state position, but rather its rate of movement is limited, and consequently the rate of opening of the throttle 4 is also limited. Since the smaller throttle dominates the rate of flow of fuel through the conduit 6, according to the law of the reciprocal of the sum of reciprocals for series throttles the pilot's sudden opening of the throttle 2 is overridden by the slower response of the throttle 4 and overfueling is limited. The piston ultimately attains a new steady state position, in which the pressure drop across the throttle 2 is equal to the pressure drop across the throttle 4. If then the pilot suddenly closes the throttle 2, the piston and the throttle 4 respond similarly as before, so that the rate of closing of the throttle 4 is limited, but the throttle 2 (being more fully closed) dominates the throttle 4 and therefore the fuel flow is in fact reduced abruptly, substantially in accordance with operation of the throttle 2 alone. It will thus be seen that the illustrated system responds in retarded fashion to a command for increase in fuel flow while responding promptly to a command for decrease in fuel flow. If desired, a check valve could be connected in parallel with the restrictor, permitting flow into the chamber 18, in which case the piston and the throttle 4 would respond promptly to closing of the throttle 2. However, this would not affect substantially the response of the entire system to a command for increase in fluid flow.

The rate at which the pressure in the chamber 18, and thus the force acting on the small piston portion 12, varies depends on the rate at which fluid flows through the restrictor 26, and this rate depends upon the pressure difference between the chamber 18 and the line 20 and the time for which such pressure difference has persisted.

One or more additional throttle, such as a throttle controlled by a propeller pitch input, could be connected in series with the throttle 2 between the connections to the lines 20 and 22.

FIG. 2 illustrates a practical construction of the system illustrated in FIG. 1. This practical construction is designed as a back-up control for the normal electronic fuel flow control system employed for an aircraft jet engine. The aircraft pilot's manual fuel control is a lever mounted on a rotary shaft, which is directly coupled mechanically to the throttle 2 and to a manual shutoff valve 38 and a change-over flow control valve 40. The valve 38 is in a conduit which by-passes the throttles 2 and 4 and the valve 40. The valve 40 is connected in parallel with the throttle 2 in order to provide a certain minimum flow for keeping the engine flame alight when there is a change over from electronic control to manual control or vice versa.

In the FIG. 2 construction, the throttle 4 is incorporated in the piston and cylinder device. To this end, the piston 8 is formed with passageways 28 providing communication between the chambers 14 and 16. The passageway 28 extending from the chamber 14 is axial of the piston and has an orifice 30 at its upstream end. A profiled needle 32 is mounted axially in the chamber 14 and projects into the orifice 30. Therefore, the conduit 6 is formed partially by the chambers 14 and 16 and the passageways 28, there being no separate lines 22 and 24 for communicating the pressure in the conduit 6 to the chambers 14 and 16. When the piston moves to the left, the needle 32 penetrates more fully into the orifice 30 and consequently the rate of flow of fuel is reduced, whereas when the piston is moved to the right the needle penetrates less into the orifice 30 and the rate of flow of fuel is increased, as in the case of FIG. 1. The profile of the needle can be selected to provide desired characteristics. For example, instead of a straight taper needle as shown in FIG. 2, a barreled needle, as shown in FIG. 2 A, can be used in order to reduce the response to displacement of the piston when the piston is at the left, around idle, while increasing the response to displacement of the piston when the piston is at the right, around maximum power.

Since the amount of fuel flowing through the restrictor 26 is very small, it is important to avoid leakage around the small piston portion 12. Such leakage would cause the rate of displacement of the piston to vary with temperature and life. Therefore a seal is provided around the piston portion 12. In view of the small variations in pressure in the chamber 18 and the consequent small changes in force effective on the small piston portion, the seal should have low friction and stiction characteristics to ensure pressure is correctly shared between the two throttles. The need for a seal about the large piston portion is not so critical, in view of the much larger flow rates affecting the chambers 14 and 16. Nevertheless, it is desirable to provide a seal about the large piston portion to minimize leakage past the servo throttle. Friction might be further reduced by use of low friction coatings, e.g. Teflon. This allows a reduction in the size of the piston and cylinder device without increasing the rate, since the rate of the device is a function of the size of the device and of the frictional forces involved.

FIG. 2 B illustrates in detail a modified form of the piston and cylinder device. It will be seen that in FIG. 2 B the piston 8 is formed as a dumbbell, comprising a waisted portion between two enlarged end portions. Each end portion is provided with a seal. The needle has a profile with three triangular flats, instead of a taper.

FIG. 3 illustrates diagrammatically an alternative to the construction illustrated in FIG. 1. In FIG. 3 the servo throttle 4 is disposed upstream of the pilot's throttle 2, and the line 24, being disposed immediately downstream of the throttle 2, is provided with the flow restrictor 26. The operation of the system will be evident from the foregoing explanation of the operation of the system of FIG. 1.

FIG. 4 illustrates diagrammatically a system which operates on the same principle as that of FIG. 3 except that the retardation in response takes place both on a reduction in demand and on an increase in demand. In order to achieve this, the conduit 6 is used only for a servoflow of fuel, there being a second conduit 34 connected in parallel with the conduit 6 and taking the main flow of fuel, and an auxiliary servo throttle 36, which is ganged to the throttle 4, is arranged to control the main flow through the conduit 34.

When the manual throttle 2 is suddenly closed, the pressure in the line 22 increases and the force driving the piston to the right increases correspondingly. Movement of the piston to the right is retarded by the restrictor 26, connected in the line 24, and accordingly the throttles 4 and 36 close more slowly than the throttle 2. Because the throttle 2 is connected in the conduit 6, and not in the main flow conduit 34, the throttle 2 is dominated by the slower-closing throttle 36, and consequently the main flow is reduced more slowly than the servoflow. If the throttle 2 is suddenly opened, on the other hand, the throttles 4 and 36 also open, but more slowly, and consequently the rate of the flow in the conduit 34 increases more slowly than the increase in the command for supply of fluid. Thus, this system operates bidirectionally as opposed to the unidirectional (increase only) systems of FIGS. 1, 2 and 3. The FIG. 4 system could be modified to retard the servo throttle 36 only upon decrease in demand by connecting a check valve in parallel with the restrictor 26 to permit fluid to flow into the chamber 16 without passing through the restrictor. Such a system could be used to eliminate water hammer by limiting the rate of closing of the throttle 36.

A modification of the system of FIG. 4 is shown in FIG. 5. The system of FIG. 5 differs from that of FIG. 4 in a similar way to that in which the system of FIG. 1 differs from that of FIG. 3. The system of FIG. 5 is preferred to that of FIG. 4, and similarly that of FIG. 1 is preferred to that of FIG. 3, because in each case, the restrictor is connected to the fuel line upstream of the throttles, and therefore any air present in the chamber to which the restrictor is connected is compressed to insignificance. A second, although less important, reason for preferring FIGS. 1 and 5 is that, in each case, if flow past the large piston portion can be ignored, only a single seal is required to avoid leakage from the chamber to which the line with the restrictor 26 is connected. In FIGS. 3 and 4, the line with the restrictor is connected to the chamber 16 and accordingly two seals, with attendant friction, are required in order to avoid leakage.

A practical implementation of the FIG. 5 system is shown in FIG. 6. The servo throttles are both incorporated in the piston and cylinder device, the needle 32 having two profiled regions 56 and 58 cooperating with two separate orifices 42 and 44 in the piston. The interior of the piston is divided by the orifice 44 into two chambers 46 and 48. The small portion 12 of the piston is formed with a peripheral recess 50 which communicates with the chamber 48 through a port 52, and the chamber 16 communicates with the chamber 46 through a port 54. The conduit 6 is formed partially by the chambers 14 and 46, the port 54 and the chamber 16, while the conduit 34 is formed partially by the recess 50, the chambers 48 and 46, the part 44 and the chamber 16.

It will be seen that when the throttle 2 is suddenly opened, the piston is displaced to the right and the effective areas of the orifices 42 and 44 increases, the rate of movement of the piston depending upon rate at which fuel is displaced from the chamber 18 through the restrictor 26 and the pressure difference between the chambers 14 and 16, i.e. the pressure drop across the throttle 4 constituted by the region 56 of the needle and the orifice 42. The throttle 36, constituted by the region 58 and the orifice 44, is slaved to the throttle 4 and thus the main flow of fuel is varied in accordance with variations in the servoflow through the throttle 4.

The systems of FIGS. 5 and 6 are bidirectional, like that of FIG. 4. The system of FIGS. 4, 5 or 6 could be modified to operate unidirectionally by connecting a check valve in parallel with the flow restrictor 26. Such a solution might be more desirable than the unidirectional system of FIGS. 2 or 3, for example, where slaving of the main flow control is desired.

A feature that the systems of FIGS. 1 to 6 have in common is that they require only two connections to the fuel flow line, namely an input and an output.

FIG. 7 illustrates an application of the FIG. 1 system to control the rate of supply of fuel to a turbo-prop engine, and consequently the power, when the propeller speed is kept constant and the pitch of the propeller is varied.

A throttle 61 is connected in series with the throttles 2 and 4 between the lines 20 and 22, and the position of the throttle 61 is controlled in dependence upon propeller pitch. Use of the throttle 61 ensures that if the pilot suddenly opens or closes the throttle 2, the response of the throttle 4 depends not only upon the pilot's demand, exerted through the throttle 2, but also on the then-existing value of the pitch of the propeller, applied through the throttle 61. Therefore the pilot cannot make the throttle system demand excessive power when the pitch is very coarse or, on the other hand, reduce the demand for power too low when the pitch is very fine.

The system of FIG. 7 includes a gear pump 60 which delivers fuel at a rate proportional to engine speed.

Fuel in excess of requirements is spilled back to the fuel line upstream of the pump by way of a line 63. The rate at which fuel is spilled back is controlled by a spill valve 64. The valve 64 comprises a body 66 defining an interior space which is divided into two chambers 68 and 70 by a diaphragm 72. The diaphragm 72 is biased by a spring 74 to establish a maximum pressure difference between the chambers 68 and 70. The chamber 68 is connected in the spill-back line 63, while the chamber 70 is connected to the fuel line downstream of the throttle 4 by a line 62. The diaphragm 72 acts on a plate valve 76, and consequently the valve is maintained at a position such that the pressure drop across the series of throttles 2, 61 and 4 is proportional to the reference force provided by the spring 74. It will therefore be seen that the net rate of flow of fuel to the pressurizing valve 78 is a function of the opening of all three throttles.

It is not necessary that a piston and cylinder arrangement should be used in any of the foregoing systems, since many equivalent arrangements are available. For example, bellows or a rolling diaphragm arrangement could be used, with the advantage that there would be no leakage.

Each of the servosystems described above has a relatively large time constant since it is designed to retard the response of the servo throttle to movement of the pilot or command throttle. However, where power amplification is the primary goal, e.g. in the case of very large valves requiring servo assistance, the time constant can be reduced by eliminating the restrictor or reducing the flow resistance thereof.

I claim:

1. A system for controlling flow of fluid along a conduit from a source of fluid under pressure to a consumer device, comprising a primary throttle means and a secondary throttle means for connection in the conduit, said primary throttle means being controllable between a first condition in which the primary throttle means is at least partially closed and a second condition in which the primary throttle means is more fully open, piston means for detecting the pressure drop across the primary throttle means, piston means for detecting the pressure drop across the secondary throttle means, and servo means for controlling the secondary throttle means to establish a feedback relationship between the pressure drop across the secondary throttle means and the time integral of the pressure drop across the primary throttle means, the means for detecting the pressure drop across the primary throttle means and the means for detecting the pressure drop across the secondary throttle means comprise first, second and third lines for connection to the conduit upstream of the primary and secondary throttle means, between the primary throttle means and the secondary throttle means and downstream of the primary and secondary throttle means, respectively, and the servo means comprises a piston and cylinder device which includes a cylinder body defining first and second cylindrical bores, the first bore being of larger cross-sectional area than the second bore, and piston means having first and second piston portions fitted in the first and second bores respectively, thereby defining a first chamber of cross-sectional area equal to that of the first bore, a second chamber of cross-sectional area equal to that of the second bore, and a third chamber defined between an inside portion of the cylinder and an outside portion of the piston, the first chamber being connected to the second line, one of the second and third chambers being connected to the first line, and the other of the second and third chambers being connected to the third line, and means for controlling the secondary throttle means in dependence upon the position of the piston means.

2. A system as claimed in claim 1, comprising a flow restrictor provided in the first line.

3. A system as claimed in claim 1, wherein the second chamber is connected to the first line.

4. A system for controlling flow of fluid along a conduit from a source of fluid under pressure to a consumer device, comprising a primary throttle means for connection in the conduit and controllable between a first condition in which it is at least partially closed and a second condition in which it is more fully open, and a secondary throttle means defining at least one orifice for connection in the conduit and including a member which is displaceable to vary the area of the orifice and the system further comprising means for applying to said member a first force dependent upon the pressure drop across the secondary throttle means and a second force, directed oppositely to said first force, dependent upon the time integral of the pressure drop across the primary throttle means, whereby the member is displaced towards a position in which said pressure drop bears a predetermined relationship to said time integral, said secondary means comprising a cylinder body defining first and second cylindrical bores, the first bore being of larger cross-sectional area than said second bore, said member comprises piston means including a first piston portion fitted in the first bore and a second piston portion fitted in said second bore, whereby a first chamber of cross-sectional area equal to that of the first bore, a second chamber of cross-sectional area equal to that of the second bore, and a third chamber defined between an inside portion of the cylinder and an outside portion of the piston, said first piston portion being formed with a passageway which provides communication between the first and third chamber and the cylinder body carrying a rod-form member of non-uniform cross-section which extends within said first chamber and projects into the passageway and cooperates with the passageway to define said orifice, said first and second chambers being connected to the primary throttle means on opposite respective sides thereof, whereby the pressure of fluid on one side of the primary throttle means is communicated to said second chamber and fluid flowing through the primary throttle means also flows through the secondary throttle means.

5. A system as claimed in claim 4, comprising a flow restrictor connected between said second chamber and said one side of the primary throttle means.

6. A system as claimed in claim 4 wherein said passageway communicates with said first chamber by way of opening and said rod-form member is of non-circular cross-section.

7. A system as claimed in claim 6, wherein the rod-form member has a central axis and is formed with at least one flat surface which extends over a major part of the length of the rod-form member and is inclined to the central axis thereof.

8. A system as claimed in claim 4, wherein said member is in the form of a dumbbell having two opposite end portions, constituting said first and second piston portion respectively, separated by a waist portion of lesser diameter than both end portions, and said passageway includes a bore in the wall of said waist portion.

* * * * *